US012625621B2

(12) United States Patent
Park

(10) Patent No.: US 12,625,621 B2
(45) Date of Patent: May 12, 2026

(54) DATA STORAGE DEVICE AND METHOD OF OPERATING THE SAME USING PRIMARY AND SECONDARY INDEXES

(71) Applicant: SK hynix Inc., Gyeonggi-do (KR)

(72) Inventor: In Hyuk Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/432,077

(22) Filed: Feb. 5, 2024

(65) Prior Publication Data

US 2025/0077095 A1      Mar. 6, 2025

(30) Foreign Application Priority Data

Aug. 29, 2023     (KR) ......................... 10-2023-0113499

(51) Int. Cl.
*G06F 3/06* (2006.01)
(52) U.S. Cl.
CPC ............ *G06F 3/062* (2013.01); *G06F 3/0658* (2013.01); *G06F 3/0679* (2013.01)
(58) Field of Classification Search
CPC ...... G06F 3/062; G06F 3/0658; G06F 3/0679; G06F 1/00–3296; G06F 3/00;
(Continued)

(56) References Cited

U.S. PATENT DOCUMENTS 11,580,162 B2 *   2/2023   Ganeshan ........... G06F 16/9014
11,947,830 B2 *   4/2024   Avraham ............... G06F 3/061
(Continued)

FOREIGN PATENT DOCUMENTS

KR     10-2013-0015731 A     2/2013
KR     10-2013-0064319 A     6/2013
(Continued)

OTHER PUBLICATIONS

Tang et al., "Accelerating Range Queries of Primary and Secondary Indices for Key-Value Separation". In SoCC '22: ACM Symposium on Cloud Computing (SoCC '22), Nov. 7-11, 2022, San Francisco, CA, USA. ACM, New York, NY, USA (Year: 2022).*

(Continued)

*Primary Examiner* — Daniel C. Chappell
(74) *Attorney, Agent, or Firm* — IP&T GROUP LLP

(57)     ABSTRACT

A data storage device includes: a memory device including a plurality of first storage areas and a plurality of second storage areas, each of which stores a primary index corresponding to a primary key provided from a host and a primary value corresponding to the primary index, and a memory controller for controlling the memory device. The memory controller is configured to generate, according to a request from the host, the primary index including the primary key and address information of a target second storage area in which a primary value corresponding to the primary key is stored, among the plurality of second storage areas, generate, according to an additional request from the host, a secondary key corresponding to a secondary value including a portion of the primary value, and generate a secondary index including the secondary key and the address information of the target second storage area.

19 Claims, 15 Drawing Sheets

(58) Field of Classification Search

CPC ......... G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G05B 13/00–048; G05B 15/00–02; G05B 17/00–02; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00

See application file for complete search history.

(56) References Cited

U.S. PATENT DOCUMENTS

| | | | |
|---|---|---|---|
| 2015/0331619 | A1 | 11/2015 | Zheng et al. |
| 2019/0155959 | A1 | 5/2019 | Lee |
| 2020/0225882 | A1 * | 7/2020 | Li .......................... G06F 12/0246 |
| 2021/0141721 | A1 * | 5/2021 | Li ............................. G06F 3/067 |
| 2021/0149868 | A1 * | 5/2021 | Li .......................... G06F 16/2282 |
| 2021/0157746 | A1 * | 5/2021 | Lee ...................... G06F 12/0882 |
| 2021/0216220 | A1 | 7/2021 | Kim et al. |
| 2021/0365208 | A1 * | 11/2021 | Li ............................. G06F 3/064 |
| 2022/0011948 | A1 * | 1/2022 | Kang ...................... G06F 16/22 |
| 2022/0358096 | A1 * | 11/2022 | Madanala ............. G06F 16/275 |

FOREIGN PATENT DOCUMENTS

| | | | | |
|---|---|---|---|---|
| WO | WO-0244943 | A2 * | 6/2002 | ......... G06F 16/2455 |
| WO | 2020/199760 | A1 | 10/2020 | |

OTHER PUBLICATIONS

Li et al., "SineKV: Decoupled Secondary Indexing for LSM-based Key-Value Stores," 2020 IEEE 40th International Conference on Distributed Computing Systems (ICDCS), Singapore, Singapore, 2020, pp. 1112-1122 (Year: 2020).*

C. Tang, J. Wan, Z. Tan and G. Li, "RepKV: A Replicated Key-Value Store to Boost Multiple Indices for Key-Value Separation," 2022 IEEE 40th International Conference on Computer Design (ICCD), Olympic Valley, CA, USA, 2022, pp. 187-194, doi: 10.1109/ ICCD56317.2022.00036. (Year: 2022).*

Markus Pilman et al. 2017. Fast scans on key-value stores. Proc. VLDB Endow. 10, 11 (Aug. 2017), 1526-1537. https://doi.org/10. 14778/3137628.3137659 (Year: 2017).*

Revisiting Secondary Indexing in LSM-based Storage Systems with Persistent Memory; Wang et al.; Jul. 2023; retrieved from https:// www.usenix.org/conference/atc23/presentation/wang-jing (Year: 2023).*

Extended European Search Report for European Patent Application No. 24197148.0 issued by the European Patent Office on Jan. 7, 2025.

Inhyuk Park et al., "KV-CSD: A Hardware-Accelerated Key-Value Store for Data-Intensive Applications", 2023 IEEE International Conference on Cluster Computing (Cluster), Nov. 2023.

* cited by examiner

Primary Index1

| Primary Key | ADDR | Offset1 | Length1 |
|---|---|---|---|
| PK1 | ADDR1 | 30 | 10 |
| PK2 | ADDR2 | 10 | 10 |
| PK3 | ADDR3 | 0 | 10 |
| ... | ... | ... | ... |
| PK10 | ADDR10 | 20 | 10 |

Primary Index2

| Primary Key | ADDR | Offset1 | Length1 |
|---|---|---|---|
| PK11 | ADDR11 | 10 | 10 |
| PK12 | ADDR12 | 30 | 10 |
| PK13 | ADDR13 | 20 | 10 |
| ... | ... | ... | ... |
| PK20 | ADDR20 | 0 | 10 |

Primary Index10

| Primary Key | ADDR | Offset1 | Length1 |
|---|---|---|---|
| PK91 | ADDR91 | 0 | 10 |
| PK92 | ADDR92 | 30 | 10 |
| PK93 | ADDR93 | 10 | 10 |
| ... | ... | ... | ... |
| PK100 | ADDR100 | 20 | 10 |

300

Primary Index Meta Data

Figure 8:
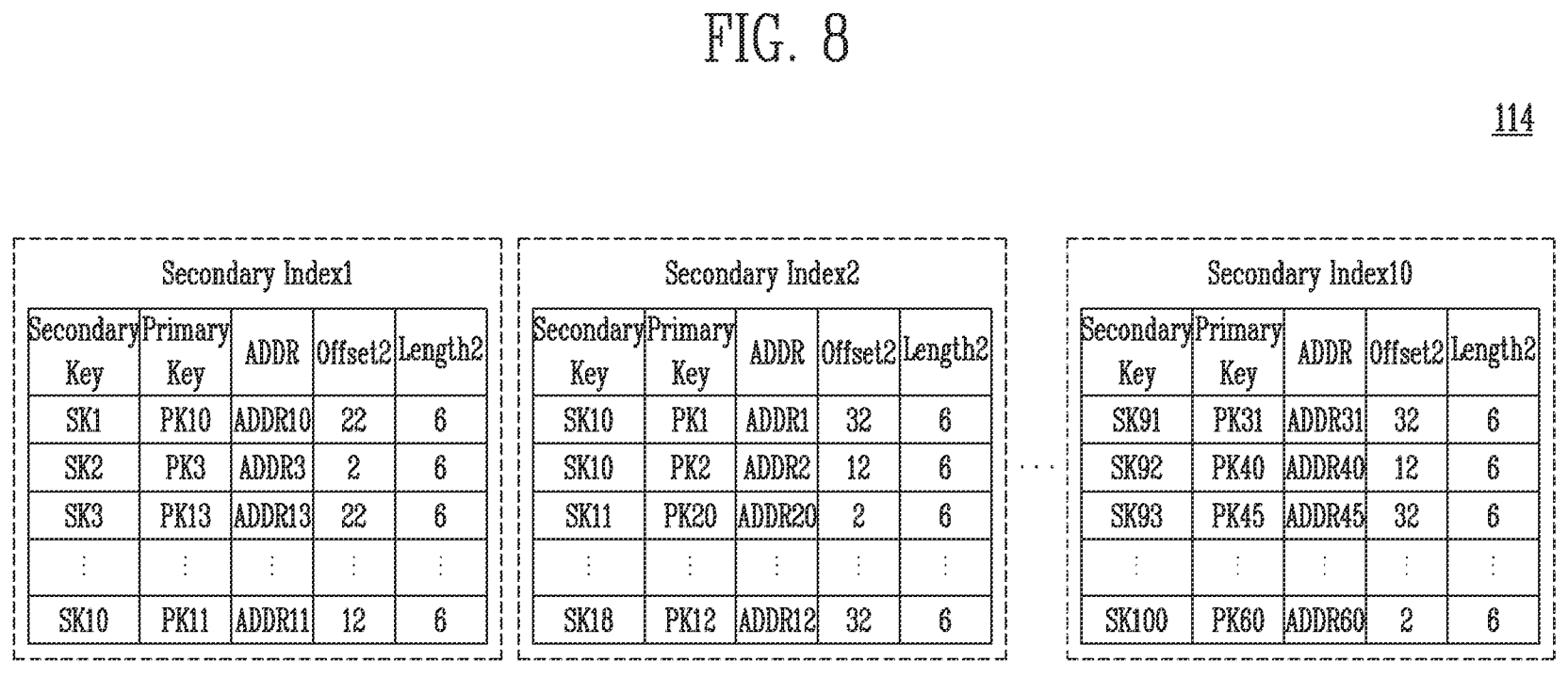

Secondary Index1

| Secondary Key | Primary Key | ADDR | Offset2 | Length2 |
|---|---|---|---|---|
| SK1 | PK10 | ADDR10 | 22 | 6 |
| SK2 | PK3 | ADDR3 | 2 | 6 |
| SK3 | PK13 | ADDR13 | 22 | 6 |
| ... | ... | ... | ... | ... |
| SK10 | PK11 | ADDR11 | 12 | 6 |

Secondary Index2

| Secondary Key | Primary Key | ADDR | Offset2 | Length2 |
|---|---|---|---|---|
| SK10 | PK1 | ADDR1 | 32 | 6 |
| SK10 | PK2 | ADDR2 | 12 | 6 |
| SK11 | PK20 | ADDR20 | 2 | 6 |
| ... | ... | ... | ... | ... |
| SK18 | PK12 | ADDR12 | 32 | 6 |

:

Secondary Index10

| Secondary Key | Primary Key | ADDR | Offset2 | Length2 |
|---|---|---|---|---|
| SK91 | PK31 | ADDR31 | 32 | 6 |
| SK92 | PK40 | ADDR40 | 12 | 6 |
| SK93 | PK45 | ADDR45 | 32 | 6 |
| ... | ... | ... | ... | ... |
| SK100 | PK60 | ADDR60 | 2 | 6 |

300

Secondary Index Meta Data

DATA STORAGE DEVICE AND METHOD OF OPERATING THE SAME USING PRIMARY AND SECONDARY INDEXES

CROSS-REFERENCE TO RELATED APPLICATION

The present application claims priority under 35 U.S.C. § 119 (a) to Korean patent application number 10-2023-0113499 filed on Aug. 29, 2023, the entire disclosure of which is incorporated by reference herein.

BACKGROUND

1. Field of Invention

Various embodiment of the present disclosure generally relate to an electronic device, and more particularly, to a data storage device and a method of operating the same.

2. Description of Related Art

A data storage device is a device which stores data under the control of a host device such as a computer or a smart phone. The data storage device may include a memory device in which data is stored and a memory controller which controls the memory device. The memory device may be a volatile memory device or a nonvolatile memory device.

The volatile memory device is a memory device in which data is stored only when power is supplied, and the stored data is lost when the supply of power is interrupted. The volatile memory device may be a Static Random Access Memory (SRAM), a Dynamic Random Access Memory (DRAM), or the like.

The nonvolatile memory device is a memory device in which data stored therein is retained even when the supply of power is interrupted. The nonvolatile memory device may be a Read Only Memory (ROM), a Programmable ROM (PROM), an Electrically Programmable ROM (EPROM), an Electrically Erasable ROM (EEROM), a flash memory, or the like.

SUMMARY

Embodiments of the present disclosure provide a data storage device capable of increasing a speed at which a specific value is searched, and a method of operating the same.

In accordance with an embodiment of the present disclosure, there is provided a data storage device including: a memory device including a plurality of first storage areas and a plurality of second storage areas, the plurality of first storage areas storing a primary index corresponding to a primary key provided from a host, and the plurality of second storage areas storing a primary value corresponding to the primary index; and a memory controller configured to control the memory device, wherein the memory controller is configured to generate, according to a request from the host, the primary index including the primary key and address information of a target second storage area in which a primary value corresponding to the primary key is stored, among the plurality of second storage areas, generate, according to an additional request from the host, a secondary key corresponding to a secondary value including a portion of the primary value, and generate a secondary index including the secondary key and the address information of the target second storage area.

In accordance with another embodiment of the present disclosure, there is provided a data storage device including: a memory device including a plurality of storage areas in which primary values corresponding to primary keys, primary indexes including the primary keys, and secondary indexes including secondary keys respectively corresponding to secondary values respectively including portions of the primary values are stored; and a memory controller configured to control, according to a read request from a host, the memory device to read target indexes including secondary keys corresponding to request keys included in the read request, among the secondary indexes, and read secondary values corresponding to the request keys, based on the target indexes.

The memory controller may provide the host with the secondary values corresponding to the request keys or primary keys corresponding to the request keys.

The request keys may include a start key and an end key, and the memory controller may control the memory device to read secondary values corresponding to secondary keys corresponding to the request keys between the start key and the end key.

When the secondary values corresponding to the request keys is greater than a predetermined size, the memory controller may provide the host with some secondary values corresponding to some request keys among the request keys and offset information of remaining request keys among the request keys.

The memory controller may provide, according to a subsequent read request received after the read request from the host, the host with remaining secondary values corresponding to the remaining request keys, based on the offset information.

The memory controller may read the target indexes, based on second index meta data including address information of a first storage area in which the secondary indexes are stored, among the plurality of storage areas.

The memory controller may control the memory device to read a second target index including a maximum secondary key among the target indexes, based on duplication key information indicating whether a same secondary key as the maximum secondary key included in a first target index among the target indexes is included.

The secondary values may correspond to specified values among the primary values according to offset information and length information, which are received from the host.

The secondary indexes may include primary keys corresponding to the secondary keys, address information of a second storage area in which the secondary values are stored, among the plurality of storage areas, and offset information and length information of the secondary values, which indicate a position of the secondary values are stored in the second storage area.

In accordance with still another embodiment of the present disclosure, there is provided a method of operating a data storage device for controlling a memory device including a first storage area and a second storage area, the first storage area storing a primary index corresponding to a primary key, and the second storage area storing a primary value corresponding to the primary index, the method including: generating the primary index including the primary key and address information of the second storage area in which a primary value corresponding to the primary key is stored; generating a secondary key corresponding to a secondary value including a portion of the primary value; and generating a secondary index including the secondary key and address information of the second storage area.

BRIEF DESCRIPTION OF THE DRAWINGS

Various embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being"between" two elements, it can be the only element between the two elements, or one or more intervening elements may also be present. Like reference numerals refer to like elements throughout.

FIG. 1 is a diagram illustrating a data storage device including a memory controller in accordance with an embodiment of the present disclosure.

FIG. 3 is a diagram for describing a primary index in accordance with an embodiment of the present disclosure.

FIG. 5 is a diagram for describing an operation of providing a primary value corresponding to a primary key in response to a read request in accordance with an embodiment of the present disclosure.

FIG. 8 is a diagram for describing a secondary index in accordance with an embodiment of the present disclosure.

DETAILED DESCRIPTION

Figure 2:
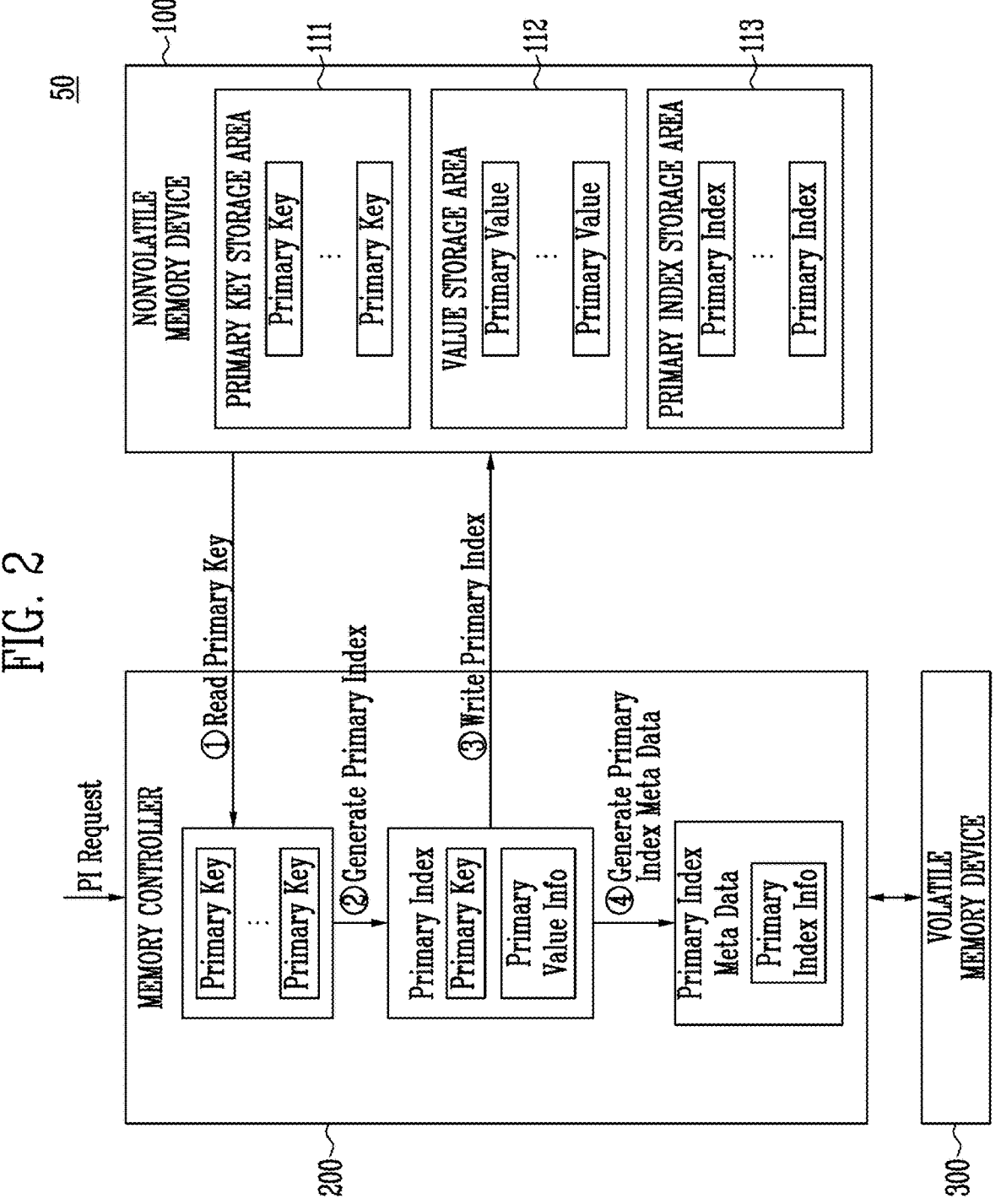
FIG. 2 is a diagram for describing an operation of generating a primary index in accordance with an embodiment of the present disclosure.

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
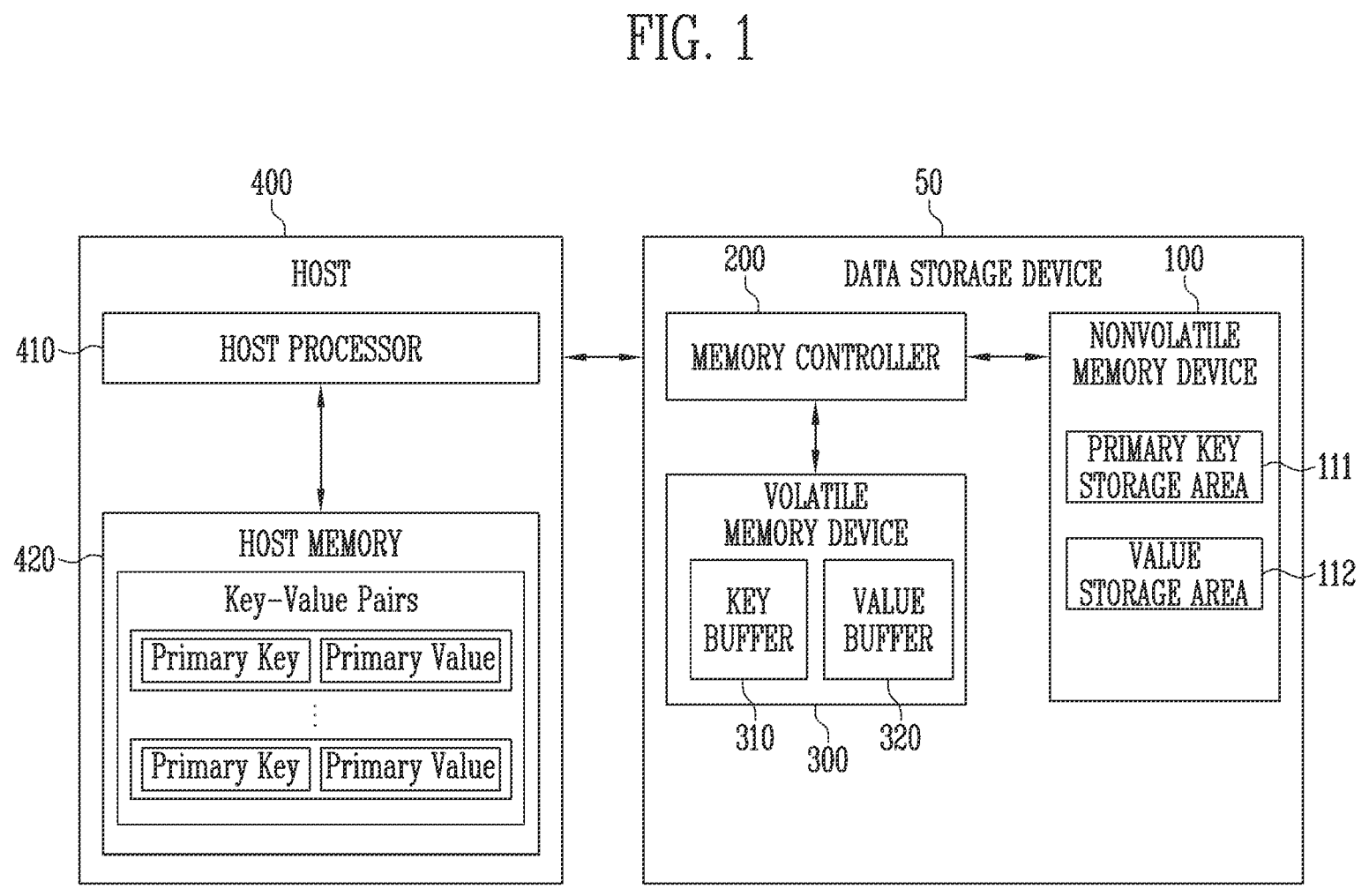

FIG. 1 is a diagram illustrating a data storage device 50 including a memory controller 200 in accordance with an embodiment of the present disclosure.

Referring to FIG. 1, the data storage device 50 may include a nonvolatile memory device 100, the memory controller 200, and a volatile memory device 300. The data storage device 50 may be a device which is included in a mobile phone, a computer, an in-vehicle infotainment, or the like, and stores data under the control of a host 400 as an external device.

The data storage device 50 may be manufactured as any of various types of storage devices such as a Solid State Drive (SSD) and a Universal Flash Storage (UFS) according to a host interface as a communication scheme with the host 400. The data storage device 50 may be manufactured as any of various package types such as a System On Chip (SOC).

The nonvolatile memory device 100 may store data. The nonvolatile memory device 100 may operate under the control of the memory controller 200.

The nonvolatile memory device 100 may receive a command and an address from the memory controller 200, and perform an operation instructed by the command on an area selected by the address. The nonvolatile memory device 100 may perform a program operation (write operation) of storing data in the area selected by the address, a read operation of reading data from the area selected by the address, or an erase operation of erasing data in the area selected by the address.

The memory controller 200 may control operations of the data storage device 50.

When power is applied to the data storage device 50, the memory controller 200 may execute firmware (FW). In an embodiment, the memory controller 200 may control communication between the host 400 and the nonvolatile memory device 100 by executing the FW. In an embodiment, the memory controller 200 may translate a logical address of the host 400 into a physical address of the nonvolatile memory device 100.

The memory controller 200 may control the nonvolatile memory device 100 to perform a program operation, a read operation, an erase operation, or the like according to a request of the host 400. The memory controller 200 may provide a command, a physical address or data to the nonvolatile memory device 100 according to a write operation, a read operation or an erase operation.

In an embodiment, the memory controller 200 may autonomously generate a command, an address, and data, regardless of any request from the host 400, and transmit the command, the address, and the data to the nonvolatile memory device 100. For example, the memory controller 200 may provide the nonvolatile memory device 100 with a command, an address, and data, which are used to perform read and program operations accompanied in performing wear leveling, read reclaim, garbage collection, and the like.

In an embodiment, the memory controller 200 may control two or more nonvolatile memory devices. The memory controller 200 may control the nonvolatile memory devices according to an interleaving scheme to improve operational performance. The interleaving scheme may be a scheme for controlling operations on two or more nonvolatile memory devices to overlap with each other.

The volatile memory device 300 may temporarily store data provided from the host 400 or temporarily store data read from the nonvolatile memory device 100. In an embodiment, the volatile memory device 300 may be a Dynamic Random Access Memory (DRAM) or a Static Random Access Memory (SRAM). In an embodiment, the volatile memory device 300 may be located outside or inside the memory controller 200.

The host 400 may communicate with the data storage device 50, using various communication schemes. In an embodiment, the host 400 may include a host processor 410 and a host memory 420. The host processor 410 may control operations of the host 400. The host memory 420 may be a volatile memory device. The host memory 420 may store key-value pairs including primary keys and primary values respectively corresponding to the primary keys.

In an embodiment, the host 400 may provide the data storage device 50 with a write request, primary keys, and primary values respectively corresponding to the primary keys.

The memory controller 200 may temporarily store primary keys and primary values in the volatile memory device 300 in response to a write request. In an embodiment, the volatile memory device 300 may include a key buffer 310 and a value buffer 320. The key buffer 310 may temporarily store primary keys. The value buffer 320 may temporarily store primary values.

In an embodiment, the memory controller 200 may control the volatile memory device 300 to store primary keys received from the host 400 in the key buffer 310 and store primary values received from the host 400 in the value buffer 320. When primary keys and primary values, which have a predetermined size, are stored in the key buffer 310 and the value buffer 320, the memory controller 200 may flush the primary keys and the primary values to the nonvolatile memory device 100.

In an embodiment, the nonvolatile memory device 100 may include a primary key storage area 111 and a value storage area 112. Each of the primary key storage area 111 and the value storage area 112 may include a plurality of memory blocks. The nonvolatile memory device 100 may store primary keys in the primary key storage area 111 and store primary values in the value storage area 112 under the control of the memory controller 200.

In an embodiment, in order to acquire a primary value corresponding to a primary key, the host 400 may provide the data storage device 50 with a read request including the primary key. The memory controller 200 may read the primary value corresponding to the primary key from the value storage area 112 and provide the read primary value to the host 400 according to the read request of the host 400. In an embodiment, the memory controller 200 may generate a primary index including information related to the primary value corresponding to the primary key, and provide the host 400 with the primary value corresponding to the primary key included in the read request of the host 400, based on the primary index. An operation in which the memory controller 200 generates a primary index will be described later with reference to FIG. 2.

FIG. 2 is a diagram for describing an operation of generating a primary index in accordance with an embodiment of the present disclosure.

Referring to FIG. 2, the memory controller 200 may control the nonvolatile memory device 100 to store primary keys and primary values respectively corresponding to the primary keys, which are received from the host 400, in the primary key storage area 111 and the value storage area 112.

After that, the memory controller 200 may generate a primary index according to a primary index generation request PI Request received from the host 400.

Specifically, the memory controller 200 may read a primary key from the primary key storage area 111 (①, Read Primary Key). The memory controller 200 may generate a primary index, based on the primary key (②Generate Primary Index). The primary index may include the primary key and information Primary Value Info related to a primary value corresponding to the primary key. The information Primary Value Info related to the primary value may include address information of a memory block in which the primary value is stored and, first offset information and first length information, which indicate a position at which the primary value is stored in the memory block in which the primary value is stored.

When a number of generated primary indexes reaches a first threshold value, the memory controller 200 may sort the primary indexes based on primary keys included in the primary indexes. In an embodiment, the memory controller 200 may sort the primary indexes in an ascending order according to a size of the primary keys included in the primary indexes.

The memory controller 200 may store the sorted primary indexes in the nonvolatile memory device 100 (③ Write Primary Index). The primary indexes may be stored in a primary index storage area 113 of the nonvolatile memory device 100. The primary indexes may be stored in a memory block among a plurality of memory blocks included in the primary index storage area 113.

The memory controller 200 may read primary values corresponding to the sorted primary indexes, based on the primary indexes. The memory controller 200 may sort the primary values to correspond to the sorted primary indexes. The memory controller 200 may sort primary values corresponding to the primary keys according to an order in which the primary indexes are sorted. The memory controller 200 may store the sorted primary values in the nonvolatile memory device 100. The sorted primary values may be stored in the value storage area 112. The sorted primary values may be stored in a memory block among a plurality of memory blocks included in the value storage area 112.

The memory controller 200 may generate primary index meta data, based on the primary index (④ Generate Primary Index Meta Data). The primary index meta data may include information Primary Index Info related to the primary index. The information Primary Index Info related to the primary index may include address information of a memory block in which the primary index is stored and information of a maximum primary key having a maximum value among primary keys included in the primary index. The memory controller 200 may temporarily store the primary index meta data in the volatile memory device 300.

FIG. 3 is a diagram for describing a primary index in accordance with an embodiment of the present disclosure.

FIG. 3 will be described with reference to FIG. 2. Referring to FIG. 3, the memory controller 200 may generate primary indexes, based on primary keys, and store the primary indexes in the primary index storage area 113. The primary indexes may include first to tenth primary indexes Primary Index1 to Primary Index10. In FIG. 3, a case where ten primary indexes are configured will be described as an example.

Each of the first to tenth primary indexes Primary Index1 to Primary Index10 may include primary keys and information related to primary values corresponding to the primary keys. The information related to the primary values may include address information ADDR, first offset information Offset1, and first length information Length1. The address information ADDR may be information indicating an address of a memory block in which a primary value corresponding to a primary key is stored. The first offset information Offset1 and the first length information Length1 may be information indicating a position at which the primary value is stored in the memory block.

In an embodiment, the first primary index Primary Index1 may include first to tenth primary keys PK1 to PK10. Address information corresponding to the first primary key PK1 may be a first address ADDR1. A first primary value corresponding to the first primary key PK1 may be stored in a first memory block corresponding to the first address ADDR1.

First offset information corresponding to the first primary key PK1 may be 30, and first length information corresponding to the first primary key PK1 may be 10. The first primary value may be stored at a specified position by 30 as the first offset information and 10 as the first length information in the first memory block.

The first primary index Primary Index1 may include address information, first offset information, and first length information, which respectively correspond to the second to tenth primary keys PK2 to PK10, identically to the address information, the first offset information, and the first length information, which correspond to the first primary key PK1. The memory controller 200 may read first to tenth primary values respectively corresponding to the first to tenth primary keys PK1 to PK10, based on the first primary index Primary Index1.

Identically to the first primary index Primary Index1, the second to tenth primary indexes Primary Index2 to Primary Index10 may include address information, first offset information, and first length information, which respectively correspond to eleventh to hundredth primary keys PK11 to PK100.

Figure 4:
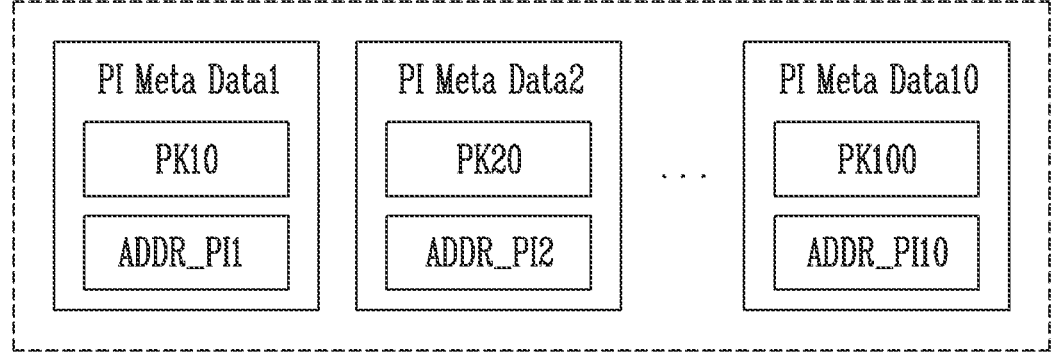
FIG. 4 is a diagram for describing primary index meta data in accordance with an embodiment of the present disclosure.

FIG. 4 is a diagram for describing primary index meta data in accordance with an embodiment of the present disclosure.

FIG. 4 will be described with reference to FIGS. 2 and 3. Referring to FIG. 4, the memory controller 200 may generate primary index meta data, based on the first to tenth primary indexes Primary Index1 to Primary Index10, and store the primary index meta data in the volatile memory device 300. The primary index meta data may include first to tenth primary index meta data PI Meta Data1 to PI Meta Data10.

In an embodiment, the first to tenth primary index meta data PI Meta Data1 to PI Meta Data10 may be meta data associated with the first to tenth primary indexes Primary Index1 to Primary Index10, respectively. The first to tenth primary index meta data PI Meta Data1 to PI Meta Data10 may include information related to the first to tenth primary indexes Primary Index1 to Primary Index10, respectively.

For example, the first primary index meta data PI Meta Data1 may be meta data associated with the first primary index Primary Index1. The first primary index meta data PI Meta Data1 may include information related to the first primary index Primary Index1. The information related to the first primary index Primary Index1 may include information of a maximum primary key having a maximum value among the primary keys included in the first primary index Primary Index1 and address information ADDR_P11 of the first primary index Primary Index1. The address information ADDR_P11 of the first primary index Primary Index1 may be information indicating an address of a memory block in which the first primary index Primary Index1 is stored.

Specifically, the first primary index meta data PI Meta Data1 may include information of the tenth primary key PK10 having a maximum value among the first to tenth primary keys PK1 to PK10 included in the first primary index Primary Index1 and address information ADDR_P11 of the first primary index Primary Index1. The address information ADDR_P11 of the first primary index Primary Index1 may be information indicating an address of a memory block in which the first primary index Primary Index1 is stored.

Identically to this, the second primary index meta data PI Meta Data2 may be meta data associated with the second primary index Primary Index2. The second primary index meta data PI Meta Data2 may include information related to the second primary index Primary Index2. The second primary index meta data PI Meta Data2 may include information on the twentieth primary key PK20 having a maximum value among the eleventh to twentieth primary keys PK11 to PK20 included in the second primary index Primary Index2 and address information ADDR_P12 of the second primary index Primary Index2. The address information ADDR_P12 of the second primary index Primary Index2 may be information indicating an address of a memory block in which the second primary index Primary Index2 is stored.

The tenth primary index meta data PI Meta Data10 may be meta data associated with the tenth primary index Primary Index10. The tenth primary index meta data PI Meta Data10 may include information of the hundredth primary key PK100 having a maximum value among the ninety-first to hundredth primary keys PK91 to PK100 included in the tenth primary index Primary Index10 and address information ADDR_PI10 of a memory block in which the tenth primary index Primary Index10 is stored. The address information ADDR_PI10 of tenth primary index Primary Index10 may be information indicating an address of the memory block in which the tenth primary index Primary Index10 is stored.

Figure 5:
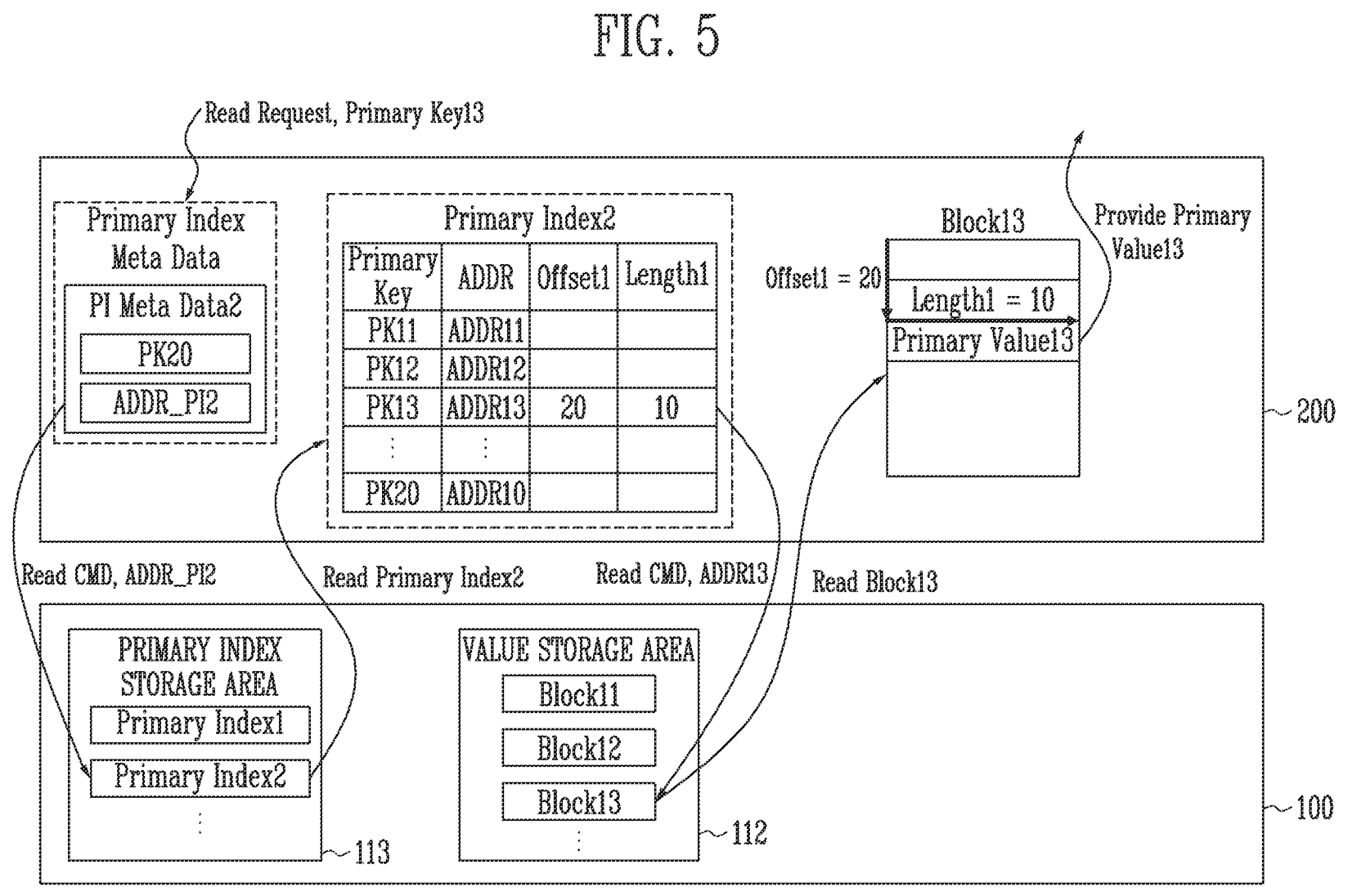

FIG. 5 is a diagram for describing an operation of providing a primary value corresponding to a primary key in response to a read request in accordance with an embodiment of the present disclosure.

Referring to FIG. 5, the memory controller 200 may receive a read request Read Request including the thirteenth primary key Primary Key13 as a primary key requested by the host 400. The memory controller 200 may control the nonvolatile memory device 100 to read a thirteenth primary value Primary Value13 corresponding to the thirteenth primary key Primary Key13 in response to the read request Read Request.

Specifically, the memory controller 200 may read primary index meta data from the volatile memory device 300. The memory controller 200 may read a primary index including the thirteenth primary key Primary Key13, based on information of a maximum primary key included in the primary index meta data.

In an embodiment, since information of a maximum primary key included in the first primary index meta data PI Meta Data1 is the tenth primary key PK10, and information of a maximum primary key included in the second primary index meta data PI Meta Data2 is the twentieth primary key PK20, the memory controller 200 may identify that the thirteenth primary key Primary Key13 is included in the second primary index Primary Index2. The memory controller 200 may control the nonvolatile memory device 100 to read the second primary index Primary Index2, based on the address information ADDR_P12 of the second primary index Primary Index2 included in the second primary index meta data PI Meta Data2.

The memory controller 200 may provide the nonvolatile memory device 100 with a read command Read CMD and the address information ADDR_P12 of the second primary index Primary Index2. The nonvolatile memory device 100 may provide the second primary index Primary Index2 to the memory controller 200 in response to the read command Read CMD.

The memory controller 200 may identify an address of a memory block in which the thirteenth primary value Primary value13 corresponding to the thirteenth primary key Primary Key 13 is stored, based on the second primary index Primary Index2. Specifically, since address information corresponding to the thirteenth primary key Primary Key13 is a thirteenth address ADDR13, the memory controller 200 may identify that the address of the memory block in which the thirteenth primary value Primary Value13 is stored is the thirteenth address ADDR13. The memory controller 200 may control the nonvolatile memory device 100 to read data stored in a thirteenth memory block Block13 corresponding to the thirteenth address ADDR13.

The memory controller 200 may provide the read command Read CMD and the thirteenth address ADDR13 to the nonvolatile memory device 100. The nonvolatile memory device 100 may provide the data stored in the thirteenth memory block Block13 to the memory controller 200 in response to the read command Read CMD.

The memory controller 200 may identify the thirteenth primary value Primary Value13 corresponding to the thirteenth primary key Primary Key13, based on the first offset information Offset1 and the first length information Length1, which correspond to the thirteenth primary key Primary Key13. The memory controller 200 may identify specific data as the thirteenth primary value Primary Value13 according to 20 as the first offset information Offset1 and 10 as the first length information Length1 among the data stored in the thirteenth memory block Block13. The memory controller 200 may provide the host 400 with the thirteenth primary value Primary Value13 corresponding to the thirteenth primary key Primary Key13.

Figure 6:
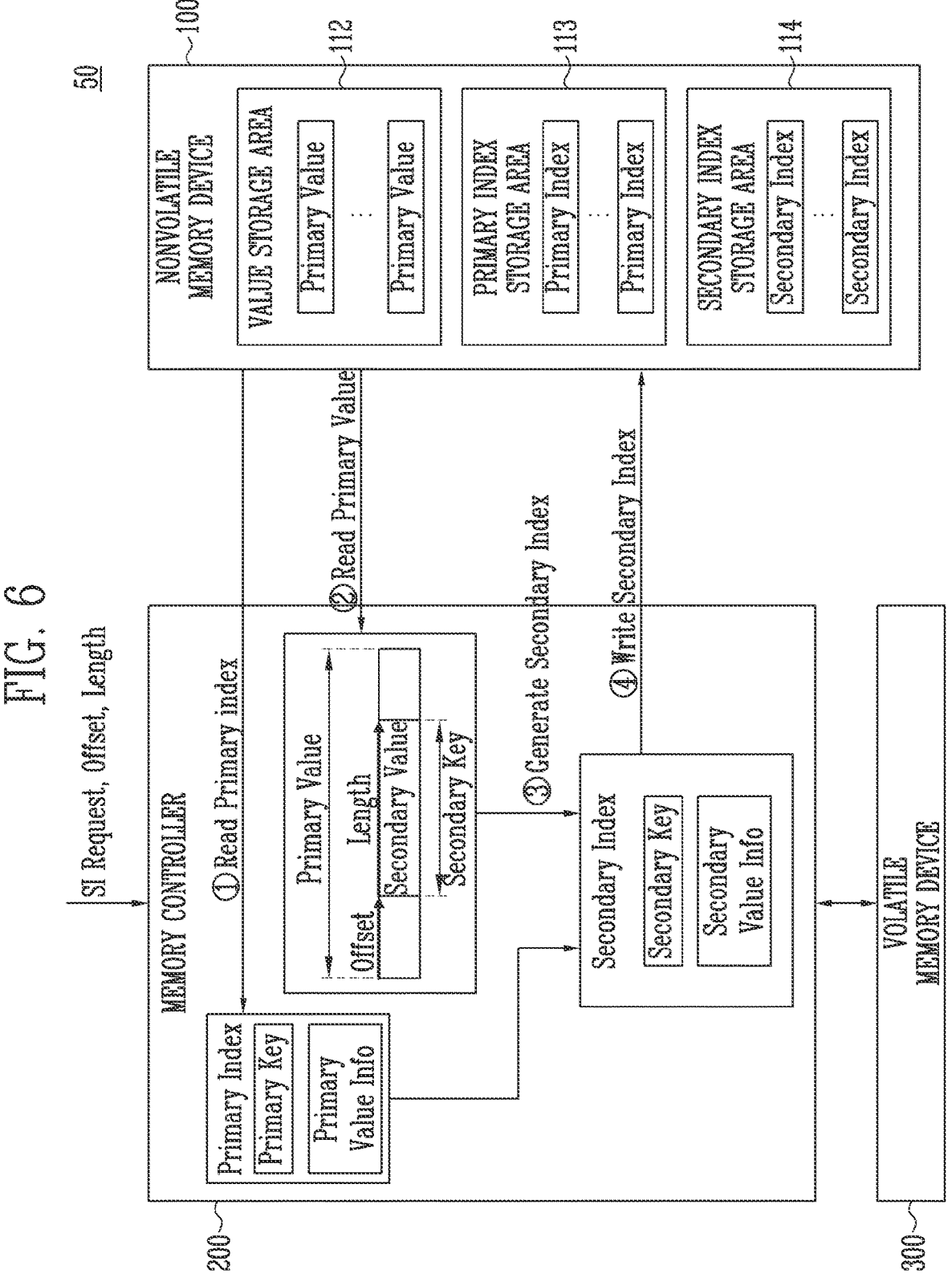
FIGS. 6 and 7 are diagrams for describing an operation of generating a secondary index in accordance with an embodiment of the present disclosure. [0026]
Figure 7:
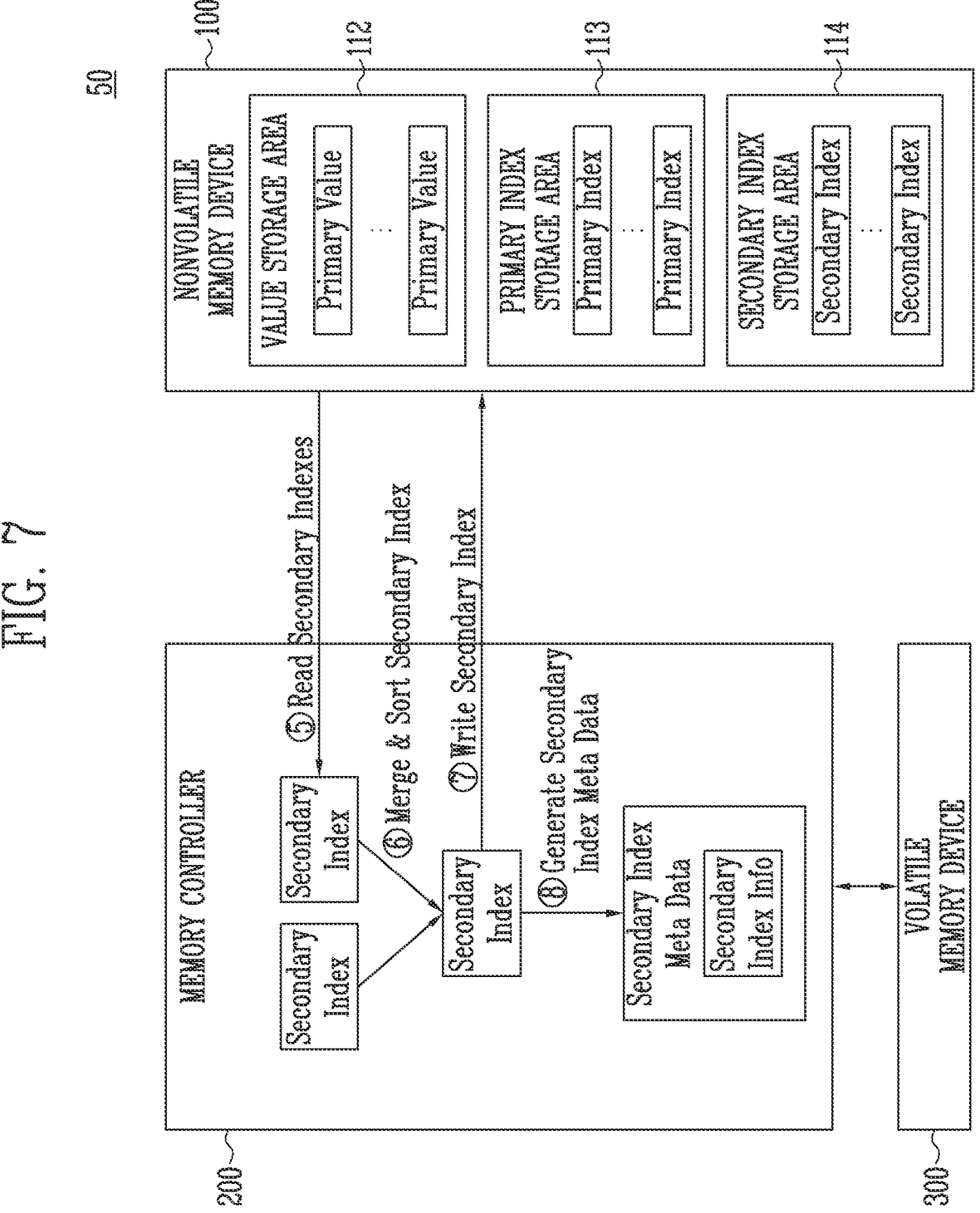

FIGS. 6 and 7 are diagrams for describing an operation of generating a secondary index in accordance with an embodiment of the present disclosure.

First, referring to FIG. 6, the memory controller 200 may generate a secondary index Secondary Index, based on a primary index Primary Index and a primary value Primary Value, in response to a secondary index generation request SI Request received from the host 400.

Specifically, the memory controller 200 may receive, from the host 400, a secondary index generation request SI Request including offset information Offset and length information Length. The memory controller 200 may read a primary index Primary Index from the nonvolatile memory device 100 in response to the secondary index generation request SI Request (①️ Read Primary Index).

The memory controller 200 may read a primary value Primary Value corresponding to a primary key from the nonvolatile memory device 100, based on information Primary Value Info related to the primary value Primary Value, included in the primary index Primary Index (②️ Read Primary Value).

The memory controller 200 may specify a secondary value Secondary Value including a portion of the primary value Primary Value, based on the offset information Offset and the length information Length. The memory controller 200 may generate a secondary key Secondary Key corresponding to the secondary value Secondary Value. The memory controller 200 may generate a secondary index Secondary Index, based on the secondary key Secondary Key and the primary index Primary Index (③️ Generate Secondary Index).

The secondary index Secondary Index may include a secondary key Secondary Key and information Secondary Value Info related to a secondary value corresponding to the secondary key Secondary Key. The information Secondary Value Info related to the secondary value may include address information of a memory block in which the secondary value is stored, and second offset information and second length information, which indicate a position at which the secondary value is stored in the memory block in which the secondary value is stored.

The memory controller 200 may provide the secondary index Secondary Index to the nonvolatile memory device 100 (④️ Write Secondary Index). The secondary index Secondary Index may be stored in a secondary index storage area 114 of the nonvolatile memory device 100. The secondary index storage area 114 may include a plurality of memory blocks.

In an embodiment, the memory controller 200 may generate secondary indexes, and temporarily store the secondary indexes in the volatile memory device 300. When a number of the generated secondary indexes reaches a second threshold value, the memory controller 200 may flush the generated secondary indexes from the volatile memory device 300 to the nonvolatile memory device 100.

Next, referring to FIG. 7, the memory controller 200 may read, from the nonvolatile memory device 100, secondary indexes of which number corresponds to the second threshold value (⑤️ Read Secondary Indexes). The memory controller 200 may merge the secondary indexes to correspond to a predetermined size, and sort the secondary indexes according to sizes of secondary keys included in the secondary indexes (⑥️ Merge & Sort Secondary Index). For example, the memory controller 200 may sort the secondary indexes in an ascending order according to an order from a secondary key having a small size to a secondary key having a large size among the secondary keys included in the secondary indexes. After that, the memory controller 200 may provide the secondary indexes Secondary Index to the nonvolatile memory device 100 (⑦️ Write Secondary Index). The secondary indexes Secondary Index may be stored in a memory block among the plurality of memory blocks included in the secondary index storage area 114.

The memory controller 200 may generate secondary index meta data Secondary Index Meta Data, based on the second index Secondary Index (⑧️ Generate Secondary Index Meta Data). The secondary index meta data Secondary Index Meta Data may include information Secondary Index Info related to a secondary index. The information Secondary Index Info related to the secondary index may include address information of a memory block in which the second index is stored and information of a maximum secondary key having a maximum value among secondary keys included in the secondary index. The memory controller 200 may temporarily store the secondary index meta data Secondary Index Meta Data in the volatile memory device 300.

FIG. 8 is a diagram for describing a secondary index in accordance with an embodiment of the present disclosure. FIG. 8 will be described with reference to FIGS. 6 and 7. Referring to FIG. 8, the memory controller 200 may generate secondary indexes including secondary keys, based on primary indexes and primary keys, and store the secondary indexes in the secondary index storage area 114. The secondary indexes may include first to tenth secondary indexes Secondary Index1 to Secondary Index10. In FIG. 8, a case where ten secondary indexes are configured will be described as an example.

The first to tenth secondary indexes Secondary Index1 to Secondary Index10 may include primary keys Primary Key corresponding to secondary keys Secondary Key and information related to secondary values corresponding to the secondary keys Secondary Key, respectively. The information related to the secondary values may include address information ADDR, second offset information Offset2, and second length information Length2. The address information ADDR may be information indicating an address of a memory block in which a secondary value corresponding to a secondary key is stored. The second offset information Offset2 and the second length information Length2 may be information indicating a position at which the secondary value is stored in the memory block.

In an embodiment, the first secondary index Secondary Index1 may include ten secondary keys. For example, the first secondary index Secondary Index1 may include a first secondary key SK1, a tenth primary key PK10 corresponding to the first secondary key SK1, and address information, second offset information, and second length information, which correspond to the first secondary key SK1. The address information corresponding to the first secondary key SK1 may be a tenth address ADDR10. A first secondary value corresponding to the first secondary key SK1 may be stored in a tenth memory block corresponding to the tenth address ADDR10. The second offset information corresponding to the first secondary key SK1 may be 22, and the second length information corresponding to the first secondary key SK1 may be 6. The first secondary value may be stored at a specified position using 22 as the second offset information and 6 as the second length information.

In an embodiment, since the first secondary key SK1 corresponds to the tenth primary key PK10, the first secondary value corresponding to the first secondary key SK1 may include a portion of a tenth primary value corresponding to the tenth primary key PK10. The first secondary value may be specified as a portion of the tenth primary value according to offset information and length information, which are received from the host 400.

In addition, referring to FIG. 3, since first offset information of the tenth primary value corresponding to the tenth primary key PK10 is 20, second offset information of the first secondary value including a portion of the tenth primary value corresponding to the tenth primary key PK10 may be 22 obtained by adding up 2 to 20 when offset information of 2 is received from the host 400.

The memory controller 200 may read the first secondary value corresponding to the first secondary key SK1, based on the first secondary index Secondary Index1 including the first secondary key SK1.

Figure 9:
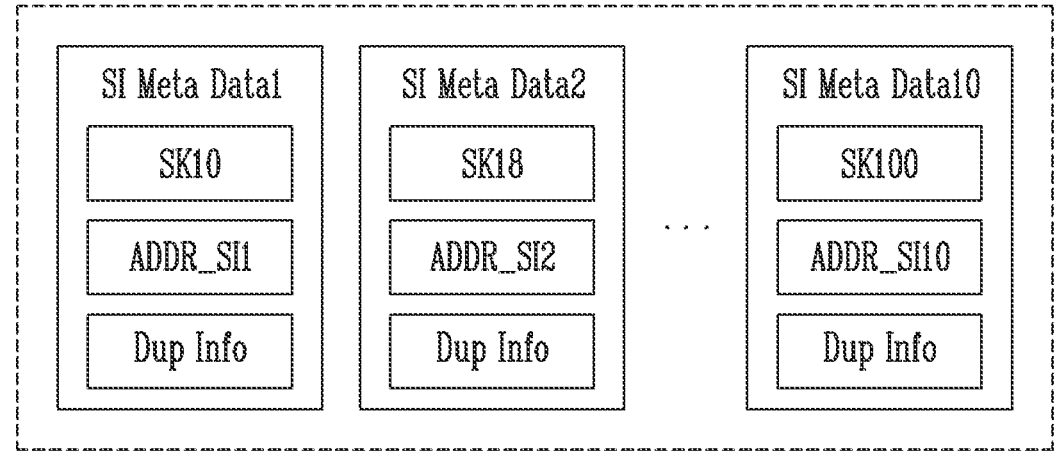
FIG. 9 is a diagram for describing secondary index meta data in accordance with an embodiment of the present disclosure.

FIG. 9 is a diagram for describing secondary index meta data in accordance with an embodiment of the present disclosure.

FIG. 9 will be described with reference to FIGS. 6 to 8. Referring to FIG. 9, the memory controller 200 may generate secondary index meta data Secondary Index Meta Data, based on the first to tenth secondary indexes Secondary Index1 to Secondary Index10, and temporarily store the secondary index meta data Secondary Index Meta Data in the volatile memory device 300. The secondary index meta data Secondary Index Meta Data may include first to tenth secondary index meta data SI Meta Data1 to SI Meta Data10.

In an embodiment, the first to tenth secondary index meta data SI Meta Data1 to SI Meta Data10 may be meta data associated with the first to tenth secondary indexes Secondary Index1 to Secondary Index10, respectively. The first to tenth secondary index meta data SI Meta Data1 to SI Meta Data10 may include information related to the first to tenth secondary indexes Secondary Index1 to Secondary Index10, respectively.

For example, the first secondary index meta data SI Meta Data1 may be meta data associated with the first secondary index Secondary Index1. The first secondary index meta data SI Meta Data1 may include information related to the first secondary index Secondary Index1. The information related to the first secondary index Secondary Index1 may include information of a maximum secondary key having a maximum value among secondary keys included in the first secondary index Secondary Index1, address information ADDR_SI1 of the first secondary index Secondary Index1, and duplication key information Dup Info. For example, the address information ADDR_SI1 of the first secondary index Secondary Index1 may be information indicating an address of a memory block in which the first secondary index Secondary Index1 is stored. The duplication key information Dup Info may be information indicating whether the same secondary key as the maximum secondary key included in the first secondary index Secondary Index1 is included in another secondary index.

Specifically, the first secondary index meta data SI Meta Data1 may include information of a tenth secondary key SK10 having a maximum value among the secondary keys included in the first secondary index Secondary Index1 and address information ADDR_SI1 of the first secondary index Secondary Index1. Since the tenth secondary key SK10 as the maximum secondary key included in the first secondary index Secondary Index1 is included in the second secondary index Secondary Index2, the first secondary index meta data SI Meta Data1 may include duplication key information Dup Info indicating that another secondary index includes a duplication key.

Identically to this, the second secondary index meta data SI Meta Data2 may be meta data associated with the second secondary index Secondary Index2. The second secondary index meta data SI Meta Data2 may include information of an eighteenth secondary key SK18 having a maximum value among secondary keys included in the second secondary index Secondary Index2, address information ADDR_SI2 of the second secondary index Secondary Index2, and duplication key information Dup Info.

The tenth secondary index meta data SI Meta Data10 may be meta data associated with the tenth secondary index Secondary Index10. The tenth secondary index meta data SI Meta Data10 may include information for a hundredth secondary key SK100 having a maximum value among secondary keys included in the tenth secondary index Secondary Index10, address information ADDR_SI10 of the tenth secondary index Secondary Index10, and duplication key information Dup Info.

Figure 10:
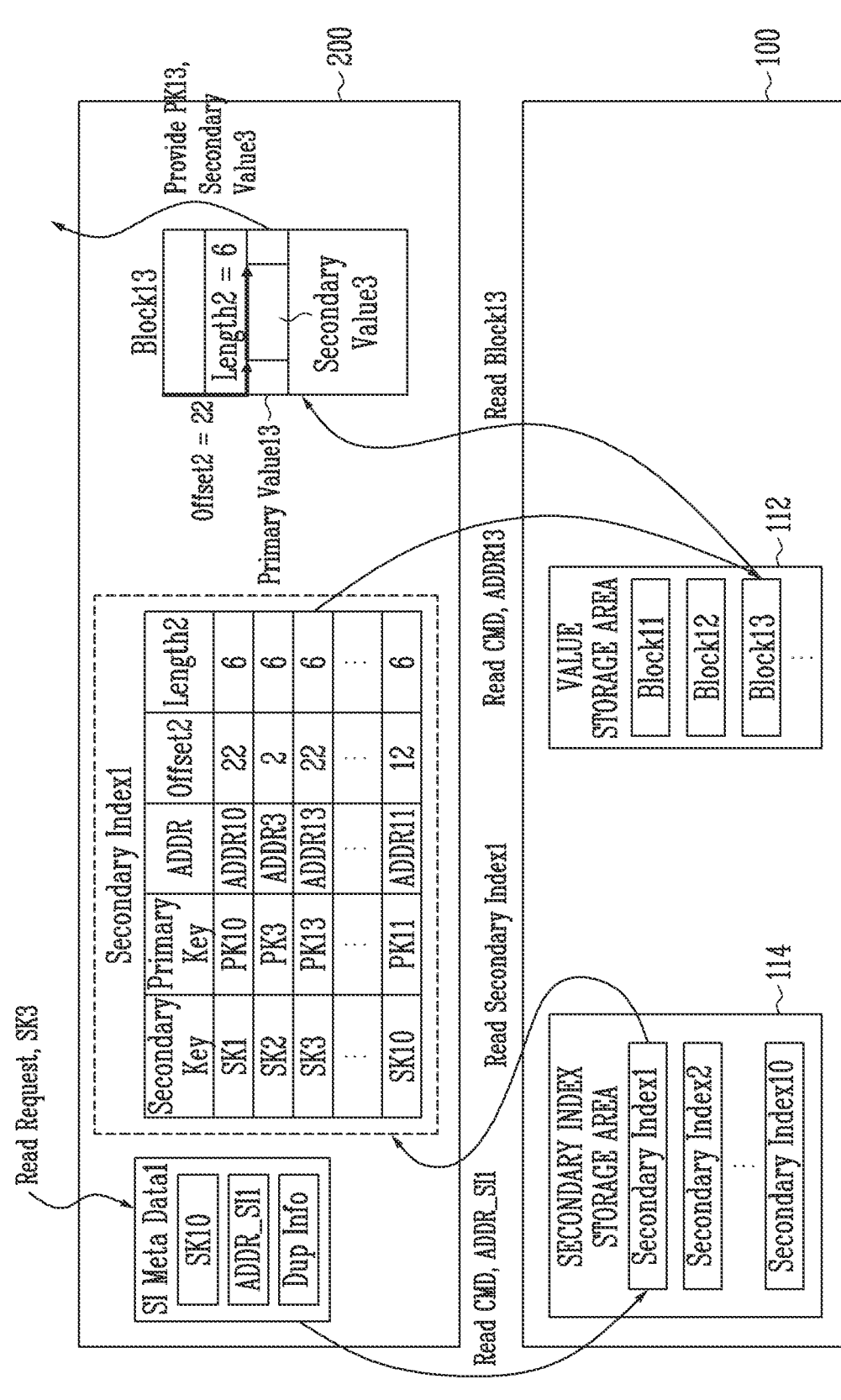
FIG. 10 is a diagram for describing an operation of reading a secondary value corresponding to a secondary key received from a host in accordance with an embodiment of the present disclosure.

The memory controller 200 may read the first to tenth secondary indexes Secondary Index1 to Secondary Index10, based on the first to tenth secondary index meta data SI Meta Data1 to SI Meta Data10. FIG. 10 is a diagram for describing an operation of reading a secondary value corresponding to a secondary key received from the host in accordance with an embodiment of the present disclosure.

Referring to FIG. 10, the memory controller 200 may receive a read request Read Request including a request key from the host 400. In FIG. 10, a case where the request key is a third secondary key SK3 will be described as an example.

The memory controller 200 may read secondary index meta data Secondary Index Meta Data from the volatile memory device 300. The memory controller 200 may read a secondary index including the third secondary key SK3, based on information of a maximum secondary key included in the secondary index meta data Secondary Index Meta Data.

In an embodiment, since the information of the maximum secondary key included in the first secondary index meta data SI Meta Data1 is the tenth secondary key SK10 and the information of the maximum secondary key included in the second secondary index meta data SI Meta Data2 is the eighteenth secondary key SK18, the memory controller 200 may identify that the third secondary key SK3 is included in the first secondary index Secondary Index1. The memory controller 200 may read the first secondary index Secondary Index1 from the nonvolatile memory device 100, based on the address information ADDR_SI1 of the first secondary index included in the first secondary index meta data SI Meta Data1.

The memory controller 200 may provide the nonvolatile memory device 100 with a read command Read CMD and the address information ADDR_SI1 of the first secondary index Second Index1. The nonvolatile memory device 100 may provide the first secondary index Secondary Index1 to the memory controller 200 in response to the read command Read CMD.

The memory controller 200 may identify an address at which a third secondary value corresponding to the third secondary key SK3 is stored, based on the first secondary index Secondary Index1. Specifically, since address information ADDR corresponding to the third secondary key SK3 is the thirteenth address ADDR13, the memory controller 200 may identify that the address of the memory block in which the third secondary value is stored is the thirteenth address ADDR13. The memory controller 200 may control the nonvolatile memory device 100 to read data stored in the thirteenth memory block Block13 corresponding to the thirteenth address ADDR13.

The memory controller 200 may provide the nonvolatile memory device 100 with the read command Read CMD and the thirteenth address ADDR13. The nonvolatile memory device 100 may provide the data stored in the thirteenth memory block Block13 to the memory controller 200 in response to the read command Read CMD.

The memory controller 200 may identify a third secondary value Secondary Value3 corresponding to the third secondary key SK3, based on second offset information Offset2 and second length information Length2, which correspond to the third secondary key SK3. The memory controller 200 may identify a specified data as the third secondary value Secondary Value3 according to 22 as the second offset information and 6 as the second length information among the data stored in the thirteenth memory block Block13. The third secondary value Secondary Value3 may be a value specified as a portion of the thirteenth primary value Primary Value13 corresponding to the thirteenth primary key PK13.

The memory controller 200 may provide the host 400 with the third secondary value Secondary Value3 corresponding to the third secondary key SK3 and the thirteenth primary key PK13 corresponding to the third secondary key SK3.

In an embodiment, the memory controller 200 may receive a read request including a request key from the host 400. In an embodiment, the request key may include a secondary key. The memory controller 200 may read a target index including the secondary key corresponding to the request key among secondary indexes, based on secondary index meta data. The memory controller 200 may read data stored in a memory block in which a secondary value corresponding to the request key is stored, based on address information ADDR included in the target index. The memory controller 200 may identify the secondary value corresponding to the request key among the data stored in the memory block, based on second offset information Offset2 and second length information Length2, which are included in the target index. The memory controller 200 may provide the host 400 with the secondary value corresponding to the request key and a primary key corresponding to the request key.

In an embodiment, the memory controller 200 may generate a secondary key corresponding to the secondary value including a portion of a primary value corresponding to the primary key, and generate a secondary index including the secondary key. The memory controller 200 may acquire a secondary value corresponding to a portion of the primary value, using the secondary index, and increase a speed at which the secondary value is provided to the host 400.

Figure 11:
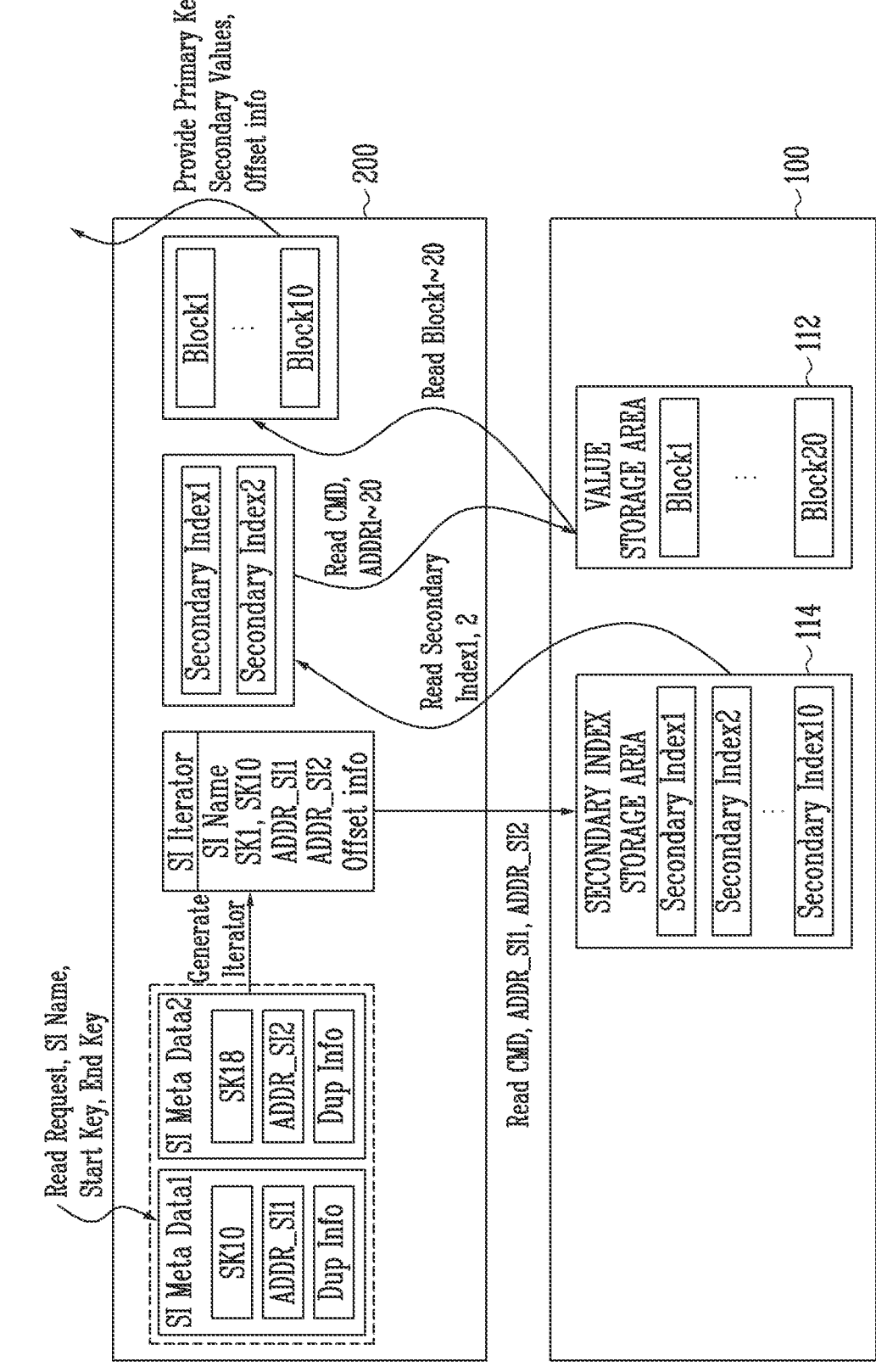
FIG. 11 is a diagram for describing an operation of reading secondary values corresponding to request keys received from the host in accordance with an embodiment of the present disclosure.

FIG. 11 is a diagram for describing an operation of reading secondary values corresponding to request keys received from the host in accordance with an embodiment of the present disclosure.

FIG. 11 will be described with reference to FIGS. 8 and 9. Referring to FIG. 11, the memory controller 200 may receive, from the host 400, a read request Read Request including request keys including a secondary index name SI Name, a start key Start Key, and an end key End Key. In FIG. 11, a case where the start key Start Key is the first secondary key SK1 and the end key End Key is the tenth secondary key SK10 will be described as an example.

In an embodiment, when a secondary index iterator SI Iterator corresponding to the secondary index name SI Name received from the host 400 is not generated, the memory controller 200 may generate the secondary index iterator SI Iterator, based on secondary index meta data.

The memory controller 200 may continuously read secondary values corresponding to secondary keys corresponding to keys between the start key Start Key and the end key End Key, using the secondary index iterator SI Iterator, and provide the secondary values to the host 400.

Specifically, the memory controller 200 may identify secondary indexes including the start key Start Key and the end key End Key, using the secondary index meta data. The memory controller 200 may identify that a secondary index including the first secondary key SK1 as the start key Start Key and the tenth secondary key SK10 is the first secondary index Secondary Index1, based on the tenth secondary key SK10 as the information of the maximum secondary key included in the first secondary index meta data SI Meta Data1. Also, the memory controller 200 may identify that the same secondary key as the tenth secondary key SK10 as the maximum secondary key included in the first secondary index Secondary Index1 is included in the secondary index Secondary Index2, based on the duplication key information Dup Info included in the first secondary index meta data SI Meta Data1.

Since the first secondary key SK1 and the tenth secondary key SK10 are included in the first secondary index Secondary Index1 and the second secondary index Secondary Index2, the memory controller 200 may generate a secondary index iterator SI Iterator for reading the first secondary index Secondary Index1 and the second secondary index Secondary Index2. The secondary index iterator SI Iterator may include a secondary index name SI Name, the first secondary key SK1 as a start key Start Key, the tenth secondary key SK10 as an end key End Key, address information ADDR_SI1 of the first secondary index, address information ADDR_SI2 of the second secondary index, and offset information Offset Info. When only secondary values corresponding to some secondary keys among secondary keys corresponding to keys between the start key Start Key and the end key End Key are provided to the host 400, the offset information Offset Info may be information indicating the other secondary keys corresponding to the other secondary values which are not provided to the host 400 among the secondary keys.

The memory controller 200 may provide the nonvolatile memory device 100 with a read command Read CMD, the address information ADDR_SI1 of the first secondary index, and the address information ADDR_SI2 of the second secondary index. The nonvolatile memory device 100 may provide the first secondary index Secondary Index1 and the second secondary index Secondary Index2 to the memory controller 200 in response to the read command Read CMD.

The memory controller 200 may identify address information of secondary values corresponding to the secondary keys corresponding to keys between the start key Start Key and the end key End Key, based on the first secondary index Secondary Index1 and the second secondary index Secondary Index2. For example, the memory controller 200 may identify that address information of secondary values corresponding to secondary keys corresponding to keys between the first secondary key SK1 to the tenth secondary key SK10 are first to twentieth addresses ADDR1 to 20. The memory controller 200 may control the nonvolatile memory device 100 to read data stored in first to twentieth memory blocks Block1 to Block20 respectively corresponding to the first to twentieth addresses ADDR1 to 20.

In an embodiment, the memory controller 200 may provide the read command Read CMD and the first to twentieth addresses ADDR1 to 20 to the nonvolatile memory device 100. The nonvolatile memory device 100 may provide the data stored in the first to twentieth memory blocks Block1 to Block20 to the memory controller 200 in response to the read command Read CMD.

The memory controller 200 may identify secondary values corresponding to secondary keys corresponding to keys between the start key Start Key and the end key End Key among the data stored in the first to twentieth memory blocks Block1 to Block20, based on the second offset information and the second length information, which are included in the first secondary index Secondary Index1 and the second secondary index Secondary Index2. The memory controller 200 may provide the host 400 with secondary values corresponding to the secondary keys corresponding to keys between the first secondary key SK1 to the tenth secondary key SK10. The memory controller 200 may provide the host 400 with primary keys corresponding to the secondary keys corresponding to keys between the first secondary key SK1 to the tenth secondary key SK10.

In an embodiment, when a size of the secondary values to be provided to the host 400 is greater than a size of the host memory 420 included in the host 400, the memory controller 200 may provide the host 400 with offset information indicating some secondary values corresponding to some secondary keys among the secondary keys corresponding to keys between the start key Start Key and the end key End Key and the other secondary keys among the secondary keys.

When the offset information Offset Info is received, the host 400 may identify that all secondary values corresponding to the secondary keys corresponding to keys between the start key Start Key and the end key End Key have not been received. Accordingly, when the offset information Offset Info is received, the host 400 may transmit a subsequent read request to the memory controller 200.

The memory controller 200 may provide the host 400 with the other secondary values corresponding to the other request keys among the secondary keys corresponding to keys between the start key Start Key and the end key End Key in response to the subsequent read request.

For example, the memory controller 200 may provide the host 400 with offset information indicating first to fifth secondary values corresponding to first to fifth secondary keys and a sixth secondary key corresponding to a sixth secondary value which is not provided to the host 400. Also, the memory controller 200 may provide the host 400 with sixth to tenth secondary values corresponding to sixth to tenth secondary keys in response to the subsequent read request.

Figure 12:
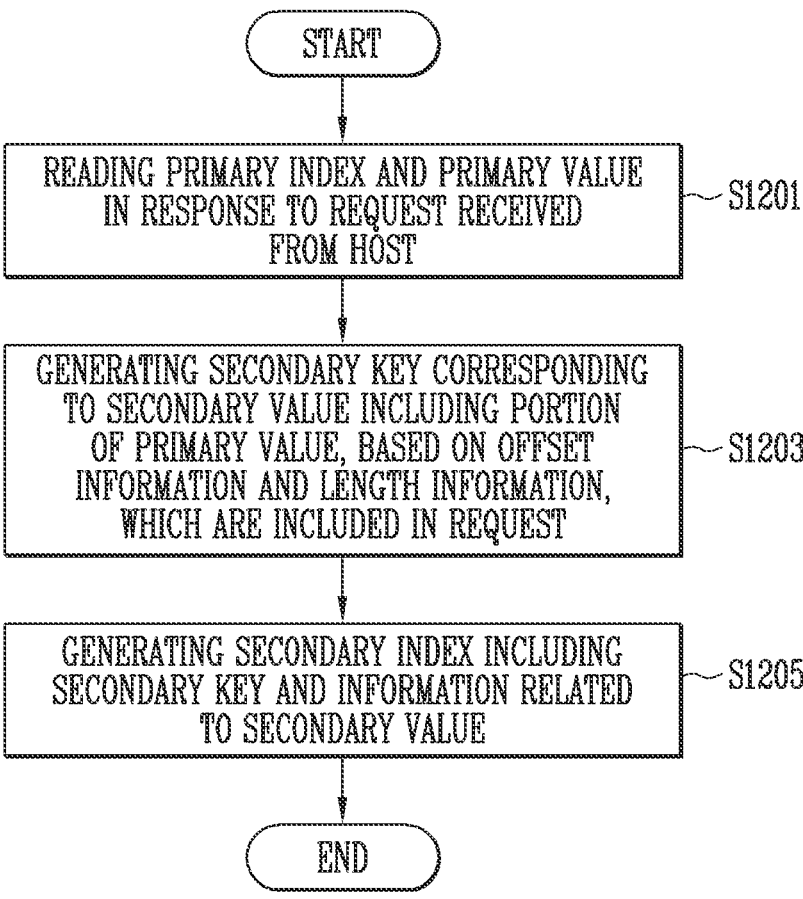
FIG. 12 is a flowchart for describing an operation of the data storage device which generates a secondary index in accordance with an embodiment of the present disclosure.

FIG. 12 is a flowchart for describing the data storage device which generates a secondary index in accordance with an embodiment of the present disclosure.

In operation S1201, the data storage device 50 may read a primary index and a primary value in response to a request received from the host. The primary index may include a primary key, address information of a memory block in which a primary value corresponding to the primary key is stored, and first offset information and first length information, which indicate a position at which the primary value is stored in the memory block.

In operation S1203, the data storage device 50 may generate a secondary key corresponding to a secondary value including a portion of the primary value, based on offset information and length information, which are included in the request of the host. The secondary value may be specified as a portion of the primary value according to the offset information and the length information.

In operation S1205, the data storage device 50 may generate a secondary index including a secondary key and information related to a secondary value. The information related to the secondary value may include address information of a memory block in which a secondary value corresponding to the secondary key is stored, and second offset information and second length information, which indicate a position at which the secondary value is stored in the memory block.

Figure 13:
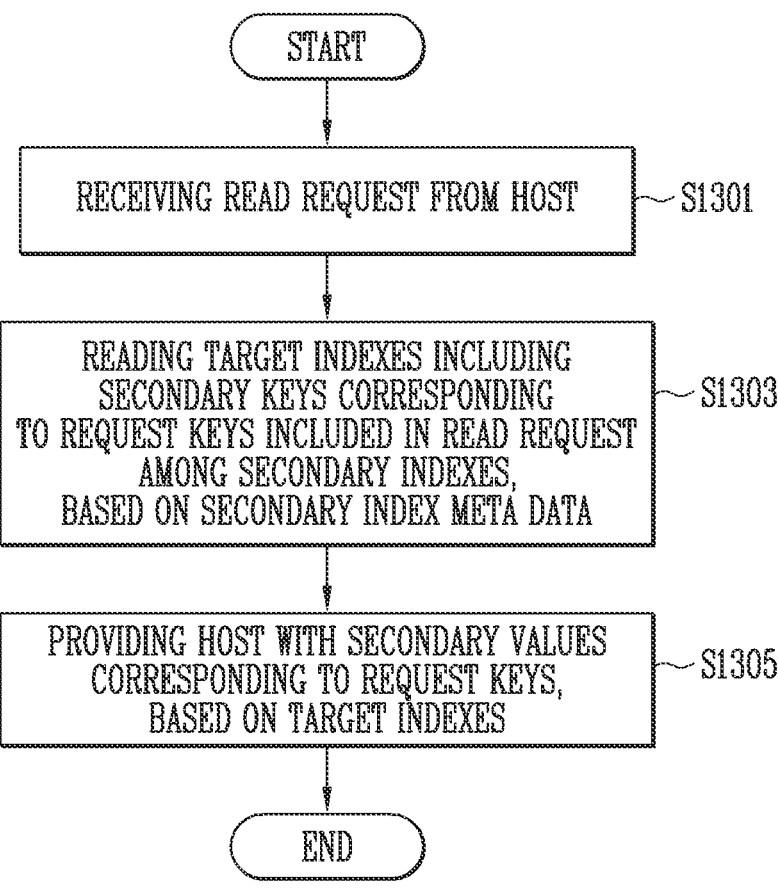
FIG. 13 is a flowchart for describing an operation of the data storage device which provides a secondary value according to a read request of the host in accordance with an embodiment of the present disclosure.

FIG. 13 is a flowchart for describing illustrating the data storage device which provides a secondary value according to a read request of the host in accordance with an embodiment of the present disclosure.

In operation S1301, the data storage device 50 may receive a read request from the host.

In operation S1303, the data storage device 50 may read target indexes including secondary keys corresponding to request keys included in the read request, among secondary indexes, based on secondary index meta data. The secondary index meta data may include address information of a memory block in which the secondary indexes are stored and information of a maximum secondary key having a maximum value among secondary keys included in the secondary indexes. The request keys may include a start key and an end key.

In operation S1305, the data storage device 50 may provide the host with secondary values corresponding to the request keys, based on the target indexes. The data storage device 50 may read secondary values corresponding to secondary keys corresponding to keys between the start key and the end key, and provide the read secondary values to the host.

Figure 14:
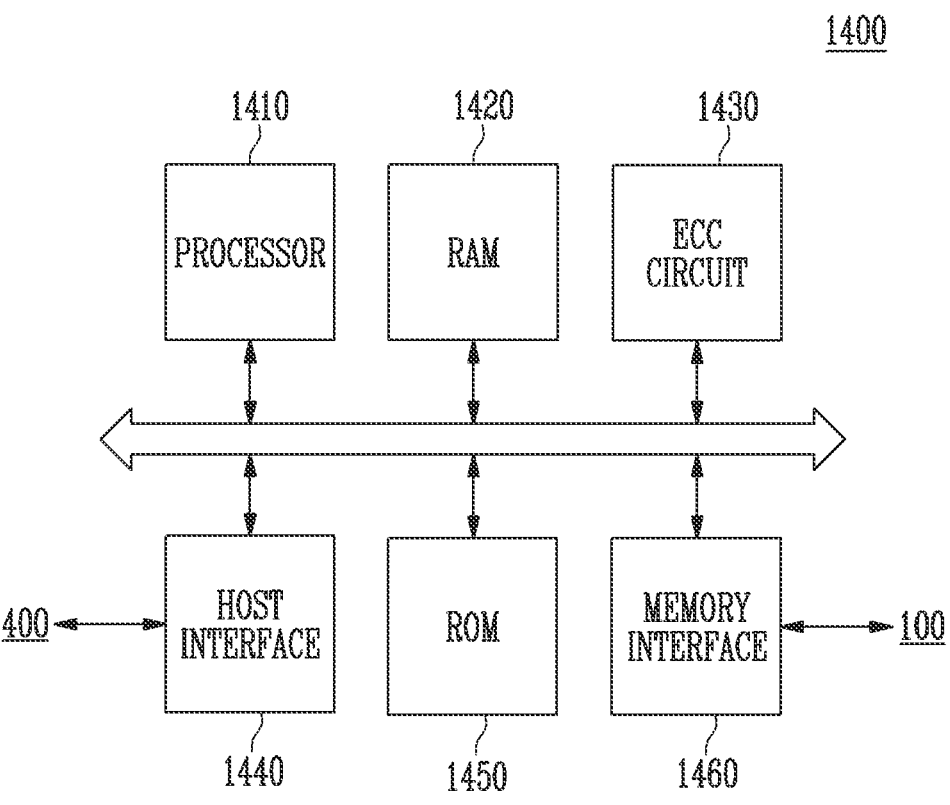
FIG. 14 is a diagram illustrating a memory controller in accordance with an embodiment of the present disclosure.

FIG. 14 is a diagram illustrating a memory controller 1400 in accordance with an embodiment of the present disclosure.

Referring to FIG. 14, the memory controller 1400 may include a processor 1410, a RAM 1420, an Error Correction Code (ECC) circuit 1430, a host interface 1440, a ROM 1450, and a memory interface 1460.

The processor 1410 may control operations of the memory controller 1400. The processor 1410 may control an operation of the memory controller 1400 to store data requested from the host 400 in the nonvolatile memory device 100. In an embodiment, the processor 1410 may read a primary index and a primary value according to a secondary index generation request of the host 400, generate a secondary key corresponding to a secondary value including a portion of the primary value, and generate a secondary index including the secondary key. The processor 1410 may read a target index including a secondary key corresponding to a request key among secondary indexes in response to a read request, and acquire a secondary value corresponding to the request key from the nonvolatile memory device 100, based on the target index.

The RAM 1420 may be used as a buffer memory, a cache memory, a working memory, or the like of the memory controller 1400. In an embodiment, the RAM 1420 may temporarily store primary index meta data and secondary index meta data.

The ECC circuit 1430 may perform error correction. The ECC circuit 1430 may perform ECC encoding, based on data to be written in the nonvolatile memory device 100 through the memory interface 1460. The ECC-encoded data may be transferred to the nonvolatile memory device 100 through the memory interface 1460. The ECC circuit 1430 may perform ECC decoding on data received from the nonvolatile memory device 100 through the memory interface 1460.

The ROM 1450 may store, in a firmware form, various information required when the memory controller 1400 is operated.

The memory controller 1400 may communicate with an external device (e.g., the host 400, an application processor, or the like) through the host interface 1440. The memory controller 1400 may receive a primary key and a primary value corresponding to the primary key through the host interface 1440. In an embodiment, the host interface 1440 may receive a read request from the host 400.

The memory controller 1400 may communicate with the nonvolatile memory device 100 through the memory interface 1460. The memory controller 1400 may transmit a command, an address, data, and the like to the nonvolatile memory device 100 through the memory interface 1460. The memory interface 1460 may provide the nonvolatile memory device 100 with a read command for acquiring a secondary value corresponding to a secondary key.

Figure 15:
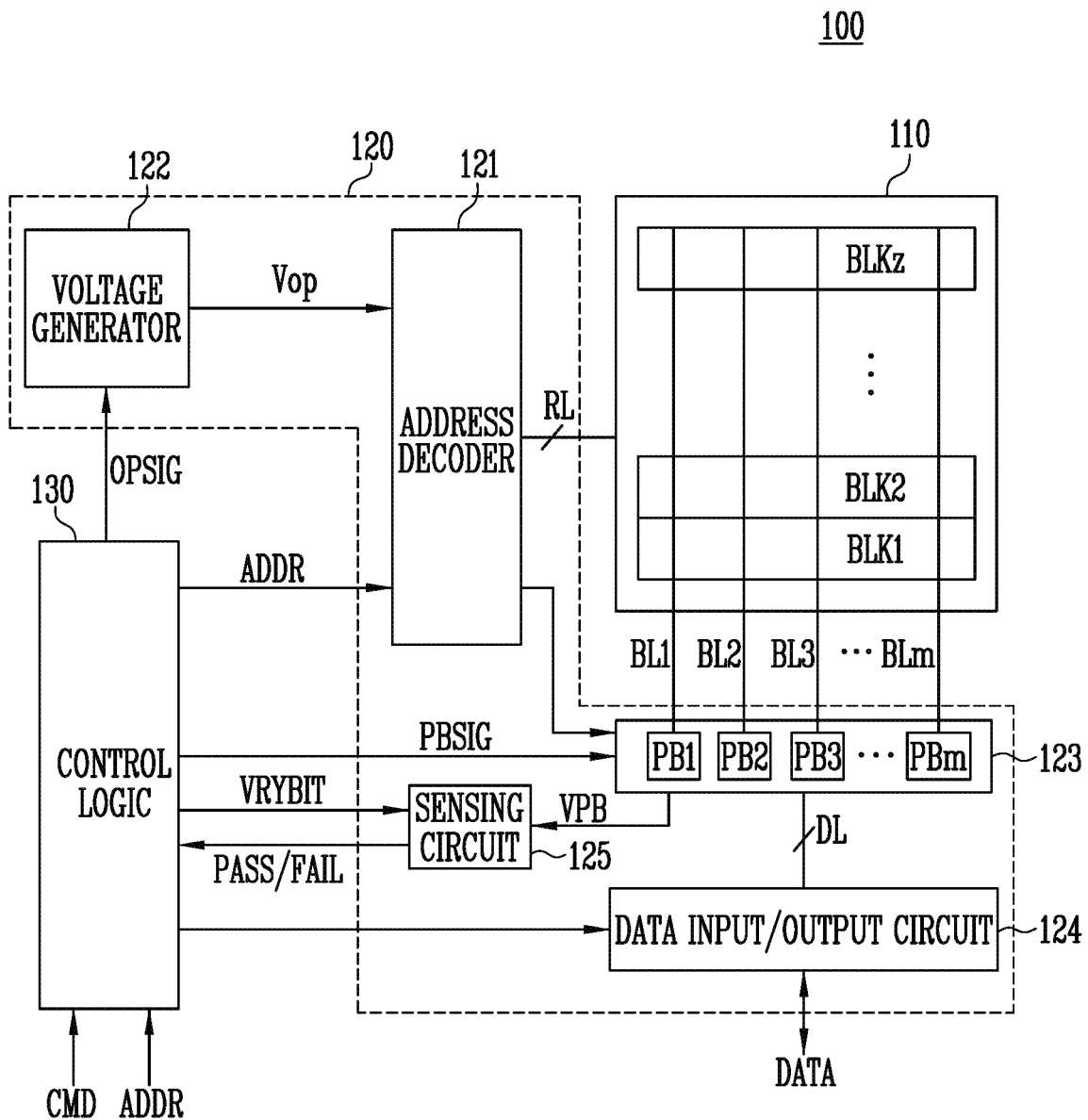
FIG. 15 is a detailed diagram of a nonvolatile memory device shown in FIG. 1 in accordance with an embodiment of the present disclosure.

FIG. 15 is a detailed diagram of the nonvolatile memory device 100 shown in FIG. 1 in accordance with an embodiment of the present disclosure.

Referring to FIG. 15, the nonvolatile memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. Memory cells connected to the same word line among the plurality of memory cells may be defined as one physical page. In an embodiment, a physical page may be a unit for storing data or reading stored data. One physical page may include a plurality of logical pages. A memory block may be a unit for erasing data.

Each of the memory cells may be configured as a Single Level Cell (SLC) storing one-bit data, a Multi-Level Cell (MLC) storing two-bit data, a Triple Level Cell (TLC) storing three-bit data, a Quad Level Cell (QLC) storing four-bit data, or a memory cell storing five-or-more-bit data.

The peripheral circuit 120 may drive the memory cell array 110. For example, the peripheral circuit 120 may drive the memory cell array 110 to perform a program operation, a read operation, and an erase operation under the control of the control logic 130. In another example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 may be connected to the memory cell array 110 through the row lines RL. The row lines RL may include drain select lines, word lines, source select lines, and a source line.

The address decoder 121 may be operated under the control of the control logic 130. The address decoder 121 may receive an address ADDR from the control logic 130.

The address decoder 121 may decode a block address in the received address ADDR. The address decoder 121 may select at least one memory block among the memory blocks BLK1 to BLKz according to the decoded block address. The address decoder 121 may decode a row address in the received address ADDR. The address decoder 121 may select at least one word line WL of the selected memory block by applying voltages provided from the voltage generator 122 to the at least one word line WL according to the decoded row address.

In a program operation, the address decoder 121 may apply a program voltage to the selected word line, and apply a pass voltage having a level lower than a level of the program voltage to unselected word lines. In a program verify operation, the address decoder 121 may apply a verify voltage to the selected word line, and apply a verify pass voltage having a level higher than a level of the verify voltage to the unselected word lines.

In a read operation, the address decoder 121 may apply a read voltage to the selected word line, and apply a read pass voltage having a level higher than a level of the read voltage to the unselected word lines.

The address decoder 121 may decode a column address in the received address ADDR. The decoded column address may be transferred to the page buffer group 123. The address decoder 121 may include components such as a row decoder, a column decoder, and an address buffer.

The voltage generator 122 may generate a plurality of operating voltages Vop by using an external power voltage supplied to the nonvolatile memory device 100. The voltage generator 122 may be operated under the control of the control logic 130.

In an embodiment, the voltage generator 122 may generate various operating voltages Vop used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages. The plurality of operating voltages Vop may be supplied to the memory cell array 110 by the address decoder 121.

The page buffer group 123 may include first to mth page buffers PB1 to PBm. The first to mth page buffers PB1 to PBm may be connected to the memory cell array 110 respectively through first to mth bit lines BL1 to BLm. The first to mth page buffers PB1 to PBm may be operated under the control of the control logic 130.

The first to mth page buffers PB1 to PBm may communicate data DATA with the data input/output circuit 124. In a program operation, the first to mth page buffers PB1 to PBm may receive data DATA to be stored through the data input/output circuit 124 and data lines DL.

In a program operation, the first to mth page buffers PB1 to PBm may transfer data DATA received through the data input/output circuit 124 to selected memory cells through the bit lines BL1 to BLm. The selected memory cells may be programmed according to the transferred data DATA. A memory cell connected to a bit line through which a program allowance voltage (e.g., a ground voltage) is applied may have an increased threshold voltage. A threshold voltage of a memory cell connected to a bit line through which a program inhibit voltage (e.g., a power voltage) is applied may be maintained. In a verify operation, the first to mth page buffers PB1 to PBm may read data DATA stored in the selected memory cells from the selected memory cells through the bit lines BL1 to BLm.

In a read operation, the page buffer group 123 may read data DATA from memory cells of a selected page through the bit lines BL, and store the read data DATA in the first to mth page buffers PB1 to PBm.

The data input/output circuit 124 may be connected to the first to mth page buffers PB1 to PBm through the data lines DL. The data input/output circuit 124 may be operated under the control of the control logic 130.

The data input/output circuit 124 may include a plurality of input/output buffers (not shown) which receive input data DATA. In a program operation, the data input/output circuit 124 may receive data DATA to be stored from the memory controller 200. In a read operation, the data input/output circuit 124 may output, to the memory controller 200, data DATA transferred from the first to mth page buffers PB1 to PBm included in the page buffer group 123.

In a read operation or verify operation, the sensing circuit 125 may generate a reference current in response to an allowance bit VRYBIT generated by the control logic 130, and output a pass or fail signal PASS/FAIL to the control logic 130 by comparing a sensing voltage VPB received from the page buffer group 123 with a reference voltage generated by the reference current. For example, the sensing circuit 125 may output the pass signal to the control logic 130 when a magnitude of the sensing voltage VPB is less than a magnitude of the reference voltage. In another example, the sensing circuit 125 may output the fail signal to the control logic 130 when the magnitude of the sensing voltage VPB is greater than the magnitude of the reference voltage.

The control logic 130 may be connected to the address decoder 121, the voltage generator 122, the page buffer group 123, the data input/output circuit 124, and the sensing circuit 125. The control logic 130 may control operations of the nonvolatile memory device 100. The control logic 130 may be operated in response to a command CMD transferred from the memory controller 200.

The control logic 130 may control the peripheral circuit 120 by generating several signals in response to a command CMD and an address ADDR. For example, the control logic 130 may generate the operation signal OPSIG, the address ADDR, a page buffer control signal PBSIG, and the allowance bit VRYBIT in response to the command CMD and the address ADDR. The control logic 130 may output the operation signal OPSIG to the voltage generator 122, output the address ADDR to the address decoder 121, output the page buffer control signal PBSIG to the page buffer group 123, and output the allowance bit VRYBIT to the sensing circuit 125. Also, the control logic 130 may determine whether the verify operation has passed or failed in response to the pass or fail signal PASS/FAIL output by the sensing circuit 125.

In accordance with embodiments of the present disclosure, there may be provided a memory controller and a data storage device including the same, which can increase a speed at which a specific value is searched.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:
1. A data storage device comprising:
a memory device including a plurality of first storage areas and a plurality of second storage areas, the plurality of first storage areas storing a primary index corresponding to a primary key provided from a host, and the plurality of second storage areas storing a primary value corresponding to the primary index; and a memory controller configured to control the memory device, wherein the memory controller is configured to:

generate, according to a request from the host, the primary index including the primary key and address information of a target second storage area in which the primary value corresponding to the primary key is stored, among the plurality of second storage areas;

generate, according to an additional request from the host, a secondary key corresponding to a secondary value including a portion of the primary value;

generate a secondary index including the secondary key and the address information of the target second storage area;

generate secondary index meta data including information of a maximum secondary key having a maximum value among secondary keys included in the secondary index; and identify a target secondary index including a request key of a read command from the host, based on the maximum secondary key included in the secondary index meta data, and wherein, when a number of primary indexes generated according to the request from the host reaches a first threshold value, the memory controller is configured to sort generated primary indexes based on primary keys included in the generated primary indexes.

2. The data storage device of claim 1, wherein the address information of the target second storage area includes first offset information and first length information, which indicate a position at which the primary value is stored in the target second storage area.

3. The data storage device of claim 1, wherein the memory controller is configured to control the memory device to store sorted primary indexes in a target first storage area among the plurality of first storage areas.

4. The data storage device of claim 1, wherein the memory controller is configured to sort primary values to correspond to sorted primary indexes.

5. The data storage device of claim 4, wherein the memory controller is configured to control the memory device to store sorted primary values in the target second storage area.

6. The data storage device of claim 3, wherein the memory controller is configured to generate primary index meta data including address information of the target first storage area.

7. The data storage device of claim 6, wherein the primary index meta data includes information of a maximum primary key having a maximum value, among the primary keys included in the sorted primary indexes stored in the target first storage area.

8. The data storage device of claim 1, wherein the memory controller is configured to generate the secondary key by selecting the secondary value among the primary values, using second offset information and second length information, which correspond to the additional request from the host.

9. The data storage device of claim 1, wherein the secondary index includes third offset information and third length information, which indicate a position at which the secondary value is stored in the target second storage area.

10. The data storage device of claim 1, wherein, when a number of secondary indexes generated according to the additional request from the host reaches a second threshold value, the memory controller is configured to sort generated secondary indexes based on the secondary keys included in the generated secondary indexes.

11. The data storage device of claim 10, wherein the memory device includes a plurality of third storage areas, and wherein the memory controller is configured to control the memory device to store sorted secondary indexes in a target third storage area among the plurality of third storage areas.

12. The data storage device of claim 11, wherein the memory controller is configured to generate the secondary index meta data including address information of the target third storage area.

13. The data storage device of claim 12, wherein the secondary index meta data further includes information of the maximum secondary key having the maximum value, among the secondary keys included in the sorted secondary indexes stored in the target third storage area.

14. The data storage device of claim 13, wherein the secondary index meta data includes duplication key information indicating whether a duplication key secondary index including same secondary key as the maximum secondary key exists in a third storage area except the target third storage area among the plurality of third storage areas.

15. A method of operating a data storage device for controlling a memory device including a first storage area and a second storage area, the first storage area storing a primary index corresponding to a primary key, and the second storage area storing a primary value corresponding to the primary index, the method comprising:

generating the primary index including the primary key and address information of the second storage area in which the primary value corresponding to the primary key is stored;

generating a secondary key corresponding to a secondary value including a portion of the primary value;

generating a secondary index including the secondary key and the address information of the second storage area;

generating secondary index meta data including information of a maximum secondary key having a maximum value among secondary keys included in the secondary index; and in response to receiving a read command including a request key from the host, identifying a target secondary index that includes the request key based on the maximum secondary key included in the secondary index meta data, wherein generating the primary index comprises, when a number of primary indexes generated according to the request from the host reaches a first threshold value, sorting generated primary indexes based on primary keys included in the generated primary indexes.

16. The method of claim 15, wherein the primary index includes first offset information and first length information, which indicate a position at which the primary value is stored in the second storage area.

17. The method of claim 15, wherein the portion of the primary value is specified as the secondary value according to second offset information and second length information, which are received from a host.

18. The method of claim 15, wherein the secondary index includes third offset information and third length information, which indicate a position at which the secondary value is stored in the second storage area.

19. The method of claim 15, further comprising:

storing the secondary index in a third storage area of the memory device; and generating the secondary index meta data including address information of the third storage area.

\* \* \* \* \*